(12) United States Patent
Perez et al.

(10) Patent No.: US 7,038,141 B2
(45) Date of Patent: May 2, 2006

(54) SUPERCONDUCTING POWER CABLE WITH ENHANCED SUPERCONDUCTING CORE

(75) Inventors: Sanchez Alfonso Perez, Querétaro (MX); Sanchez Jose Luis Nieto, Querétao (MX); Méndez Mauro Eduardo Maya, Querétar (MX)

(73) Assignee: Servicios Condumex S.A. de C.V., Queretaro (MX)

( * ) Notice: Subject to any disclaimer, the term of this patent is extended or adjusted under 35 U.S.C. 154(b) by 625 days.

(21) Appl. No.: 10/334,842

(22) Filed: Dec. 31, 2002

(65) Prior Publication Data

US 2004/0020683 A1 Feb. 5, 2004

(30) Foreign Application Priority Data

Aug. 1, 2002 (MX) .............................. PA/a/2002/007435

(51) Int. Cl.
*H01B 12/00* (2006.01)

(52) U.S. Cl. .................... 174/125.1; 174/15.4; 505/230; 505/231

(58) Field of Classification Search ................ 174/15.4, 174/15.5, 125.1, 105 SC, 106 SC, 102 SC; 505/230–232, 430–432
See application file for complete search history.

(56) References Cited

U.S. PATENT DOCUMENTS

| 6,262,375 | B1 * | 7/2001 | Engelhardt et al. | 174/125.1 |
| 6,633,003 | B1 * | 10/2003 | Nassi et al. | 174/125.1 |
| 6,794,579 | B1 * | 9/2004 | Caracino et al. | 174/125.1 |
| 2003/0000731 | A1 * | 1/2003 | Hughey et al. | 174/125.1 |
| 2003/0159847 | A1 * | 8/2003 | Adrian et al. | 174/106 R |

* cited by examiner

*Primary Examiner*—Randy W. Gibson
*Assistant Examiner*—Jeremy Norris
(74) *Attorney, Agent, or Firm*—Carmen Pill Ekstrom (57) ABSTRACT

Enhanced superconducting power cable of at least one phase, characterized by two tubular sections, the first section being a flexible superconducting core, with a stainless steel tape mesh and copper tape layers overlaid at an angle of 0° to 45° followed by two or more superconducting material layers placed overlaid and a second application of two or more superconducting material layers in opposite direction with regard to the previous ones; the second tubular section is an annular space of vacuum thermal insulation formed by a flexible corrugated pipe covered with multilayer insulations, including also a pipe with a stainless steel mesh to adhere an internal semiconducting shield made of polyethylene with insulation followed by a second metal shield based on copper tapes and a polyethylene protecting cover.

40 Claims, 6 Drawing Sheets

SUPERCONDUCTING POWER CABLE WITH ENHANCED SUPERCONDUCTING CORE

BACKGROUND OF THE INVENTION

1. Field of the Invention

The instant invention relates to the conduction of electric power and particularly to the manufacturing of a superconducting power cable of at least one phase, characterized by a central core based on a superconducting tape material BSCCO of 22233 ($Bi_2$ $Sr_2$ $Ca_2$ $Cu_3$ $O_x$) commercial composition giving a minimum current density of 7 KA/cm$^2$ under the criteria of 1 µV/cm. It also includes an annular space of thermal insulation system wherein the corrugated casing of the system presents a vacuum pressure below 10 mPa (milliPascals) permitting the thermal insulation to maintain operating temperatures of 77°K (temperature of liquid nitrogen under atmospheric pressure) throughout the cross section of the cable in its superconducting part.

2. Previous Art

The invention relates to the transportation of electric power in superconducting conditions, zero resistance in direct current. This invention replaces the use of power cables for distribution and transmission in voltages from 15 kV upwards because it presents lower conduction losses.

High temperature superconductors can be important aspects of technological advances, because equipment and devices could have superconducting parts in their components. An obvious application in superconducting state is the use of zero resistance properties to the passage of direct current and low power losses in the electricity transmission. In the present transmission lines, electric power is lost through heat when the current passes through normal conductors. If electricity is transmitted through superconducting cables, said losses can be reduced or eliminated with the subsequent savings in the energy costs. This can be applied to any electric component having cooper leads, for examples, motors, transformers, generators and any equipment involved with electric power.

Some US and Japanese companies have manufactured and evaluated superconducting cable models of up to 5000 cm obtaining current values not exceeding 1700 A to 2000 A. Tests conducted in 5000 cm long segments have shown problems related to current distribution among layers. Said distribution tends to be irregular because of electromagnetic problems related to the lead itself.

Patent WO 00/39813 describes a superconducting cable using high temperature superconducting materials HTS with flexible core. However it applies to a traditional coaxial design with insulated HTS tape layers and cold design.

Japanese Patent 06239937 A2 describes a superconducting cable with HTS materials and flexible core but involving a traditional DC (direct current) design and insulation between each HTS tape layer.

U.S. Pat. No. 5,929,385 describes a superconducting cable similar to the object of the instant invention but only as far as the type of materials used is concerned. U.S. Pat. No. 5,952,614 also describes a superconducting cable similar as far as the use of HTS materials and flexible core are concerned but with a coaxial design, in cold conditions and with HTS tape traditional design. For these reasons, said inventions are different from the characteristics of the instant invention.

DESCRIPTION OF THE INVENTION

Hereinafter the invention will be described in connection with the drawings of FIGS. 1 to 6, wherein.

Figure 5:
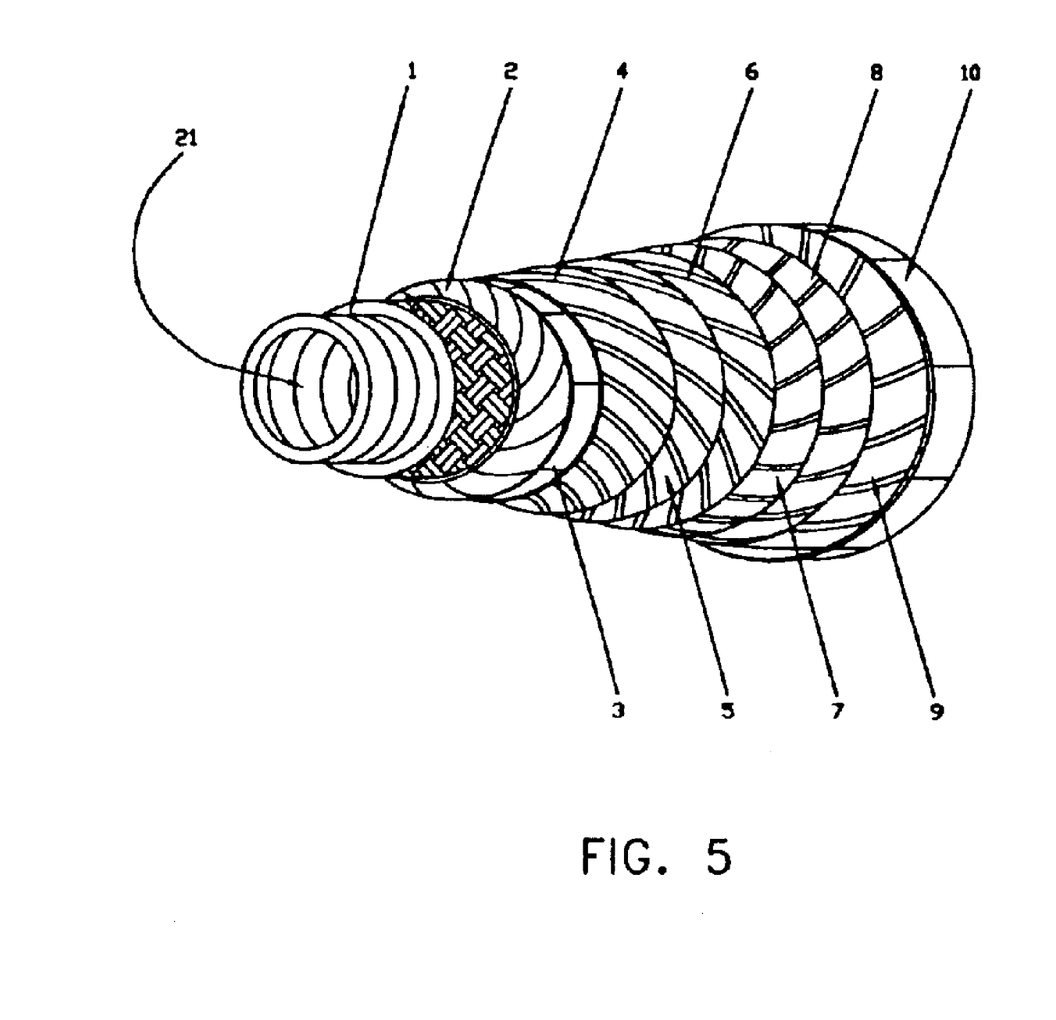
FIG. 5 is a perspective view with cross section of the superconducting power cable core.

The invention is related to the transportation of electricity in superconducting conditions, (zero resistance in direct current). This invention replaces the use of power cables for distribution and transmission in voltages of 15 kV or more because it presents lower conduction power losses, considering that for a Cu lead with a current density of 1–4 A/mm$^2$ and a resistivity of $2\times10^{-8}$ Ωm, the transmission losses are on the order of 20–80 mW/Am. To better compare with superconducting cables, losses caused by the heating of superconducting materials have to be taken into account. At cryogenic temperatures, said losses are defined by a Carnot factor divided between the efficiency of the cooling system. In the case of liquid nitrogen, this factor is between 10 and 20. Thus, in a superconductor losses will be lower than 5 mW/Am. The flow of liquid nitrogen fills the longitudinal cavity 21, FIG. 5, of the flexible corrugated pipe 1 of 304 or 316 stainless steel. Said pipe can have an external diameter between 2 cm and 6 cm and an internal diameter between 1 cm and 4 cm wherein the depth of the corrugation can vary between 0.5 cm and 1 cm. The corrugation pitch can be between 0.8 and 1.5 cm for a corrugation depth between 0.4 and 0.5 cm. As another alternative for a depth between 0.4 and 0.6 cm, the corrugation pitch can be between 1.6 and 3 cm. On this pipe, a 304 or 316 stainless steel mesh is placed in order to obtain a relatively flat surface. On this mesh a stainless steel tape layer 2 is placed, between 4 and 5 cm wide and between 0.0005 and 0.006 thick. They are placed on the corrugated pipe with spacing between 0.15 and 0.2 cm. Then one or two additional stainless steel tapes, 2.5 to 4 cm wide and 0.001 to 0.002 cm thick, are placed with spacing between the tapes of 0.1 to 0.15 cm. After a first layer of Cu tapes 3 is placed, from 0.25 to 0.40 cm wide and from 0.025 to 0.030 cm thick, with a cabling length between 2 cm and 100 cm depending on the design of the first layer of superconducting tapes to be applied. Said layer of Cu tapes can be laid at an angle ranging from 0° to 45° depending on the cable design. The superconducting material to be used is made of tapes of a 22233 ($Bi_2$ $SR_2$ $Ca_2$ $Cu_3$ $O_x$) composition commercial product BSCCO. Said tapes range in width between 0.38 and 0.42 cm and in thickness between 0.018 and 0.022 cm, which gives a minimum current density of 7 kAcm$^2$ under the criteria of 1 µV/cm, (microvolt/centimeter). With this superconducting material, two or more layers of tapes are laid with a cabling lay length between 20 cm and 300 cm, at an angle ranging from 0° to 45° depending on the design of each layer with a direction that can be right or left 4, 5, 6. And two or more layers of superconducting material tape with a lay length between 20 cm and 300 cm with an angle ranging from 0° to 45° depending on the design of each layer with a direction that can be right or left with regard to the cabling, in the opposite direction of the previously placed layers 7, 8, 9. Finally, a wrapping tape made of insulating material 10, with a thickness ranging between 0.005 and 0.01 cm and a width ranging between 2 and 4 cm is laid.

Figure 6:
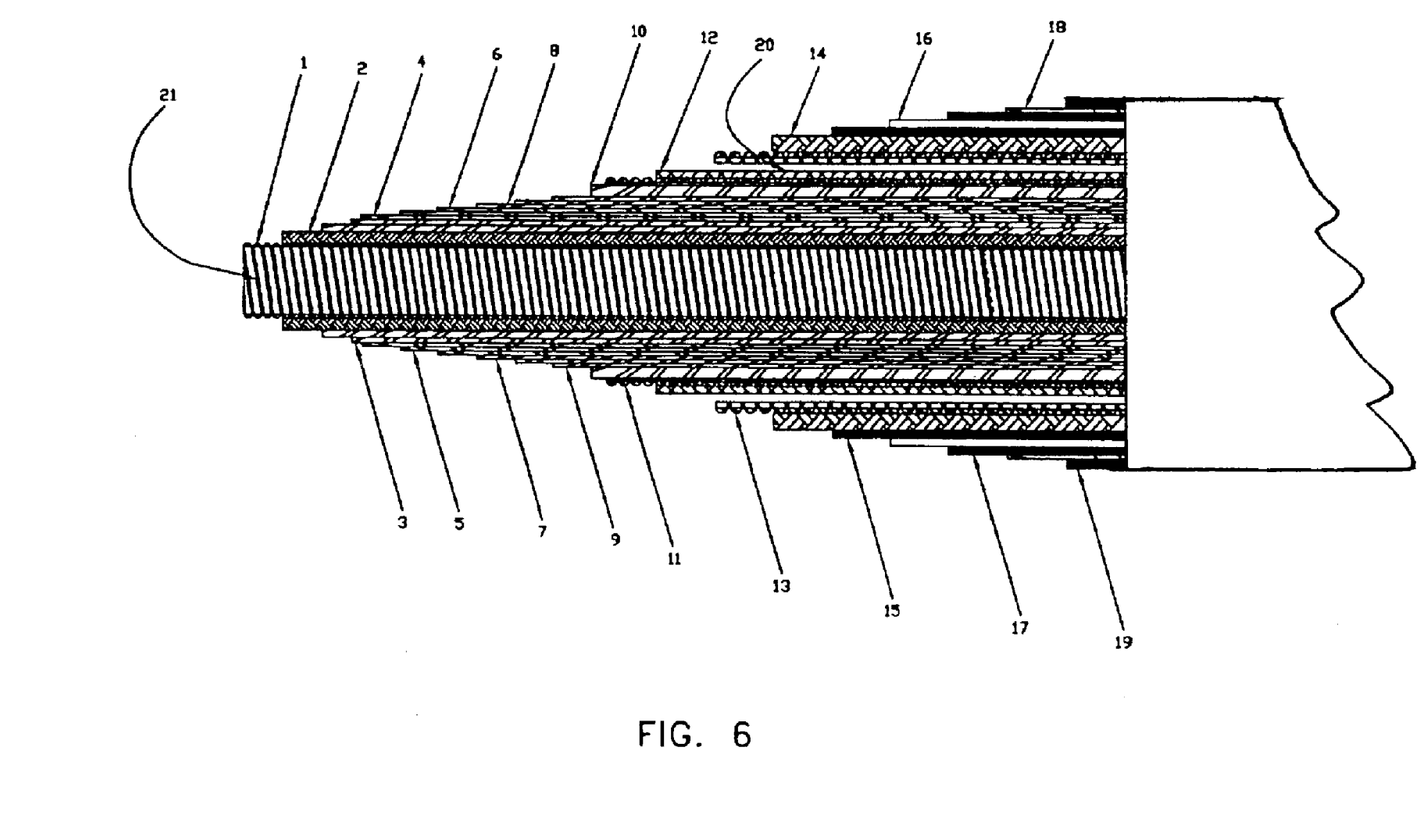
FIG. 6 is a perspective view with longitudinal cross section of FIG. 1, showing the annular space of thermal insulation.

In order to protect the central core, the superconducting power cable object of the instant invention is also characterized because it includes a vacuum thermal insulation system consisting of a flexible corrugated pipe 11 made of 304 or 316 stainless steel, to hold the superconducting cable and liquid nitrogen. Said pipe can have an external diameter ranging between 4 cm and 8 cm and an internal diameter ranging between 3 cm and 7 cm, the corrugation depth varying between 0.5 cm and 1 cm. The corrugation pitch can vary between 1 cm and 2 cm for a corrugation depth between 0.5 and 0.8 cm. Then, on the periphery of this pipe, a multi layer thermal insulation ($\rho_a$) 12 is applied, which can have a thickness ranging between 0.0005 cm and 0.005 cm which is calculated according to the following formula:

$$\rho_a = (S_s + \rho_r t_r)(N/\Delta x)$$

wherein:
$\rho_a$ Thickness of the insulating layer
$S_s$ Mass of the material per area unit
$\rho_r$ Insulating material density
$t_r$ Thickness of the anti-radiation casing
$N/\Delta x$ Layer density Concentrically around the flexible corrugated pipe 11, covered with the insulating material 12, a second corrugated pipe 13 is placed, creating the vacuum thermal insulation space 20, FIG. 6.

To ensure the adequate functioning of the thermal insulation system at a temperature of 77°K, a vacuum pressure below 10 mPa. (milliPascals) is required.

Said second corrugated pipe 13, which creates the vacuum space, is made of 304 or 316 stainless steel which can have and external diameter ranging between 8 cm and 10 cm and an internal diameter ranging between 6 and 7 cm, wherein the depth of the corrugations may vary between 0.5 cm and 1.5 cm. The corrugation pitch can be between 1 and 2 cm for a corrugation depth between 0.5 and 1 cm.

Figure 1:
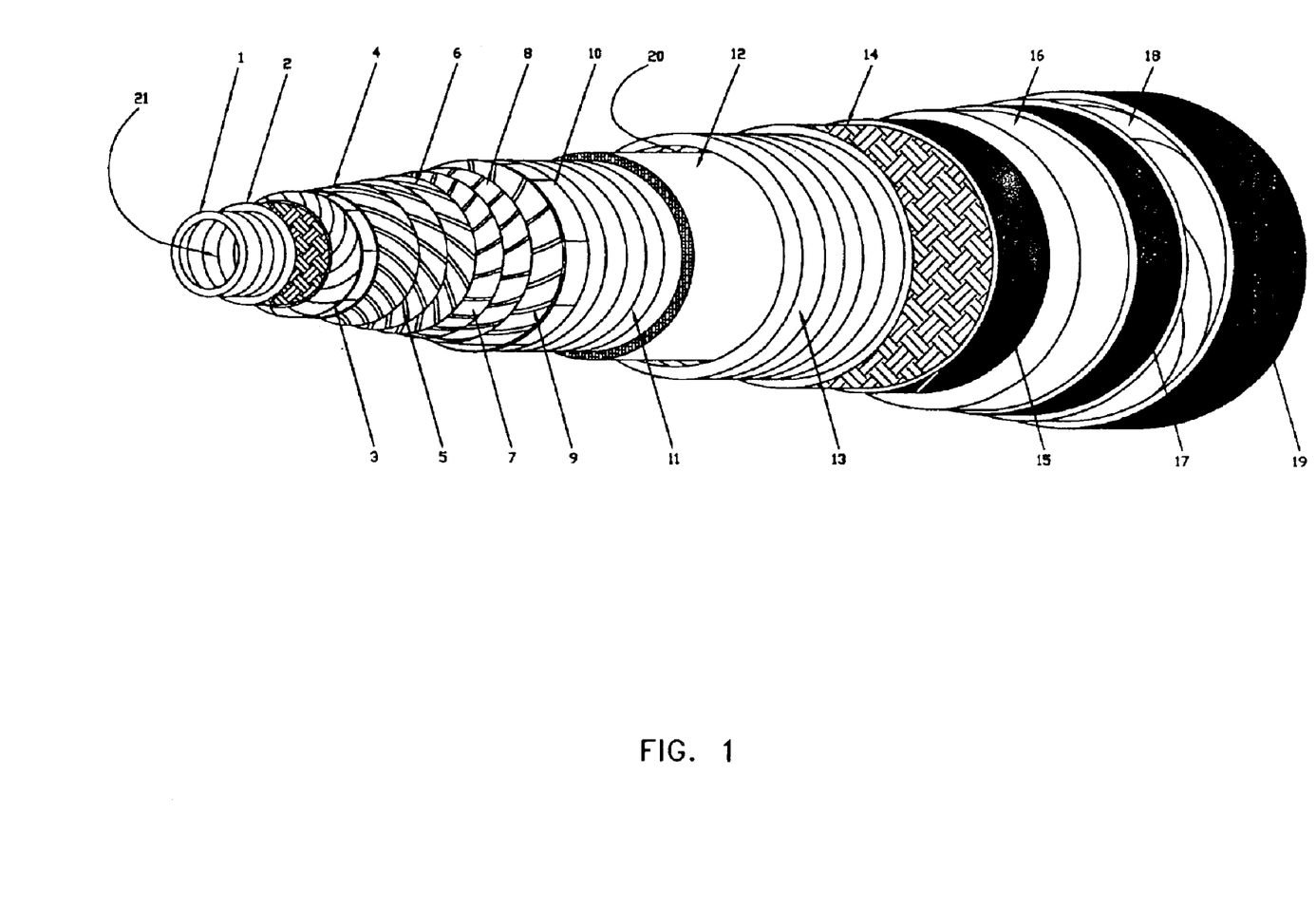
FIG. 1 is a perspective view with cross section showing the different layers of the superconducting power cable.
Figure 2:
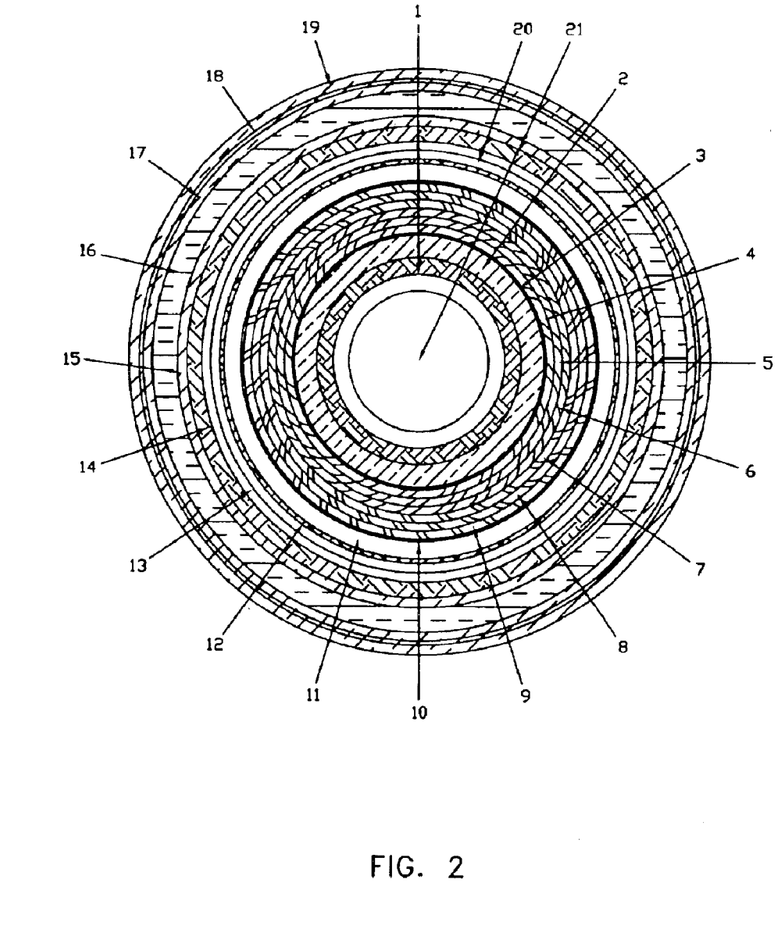
FIG. 2 is a cross section view of FIG. 1.
Figure 3:
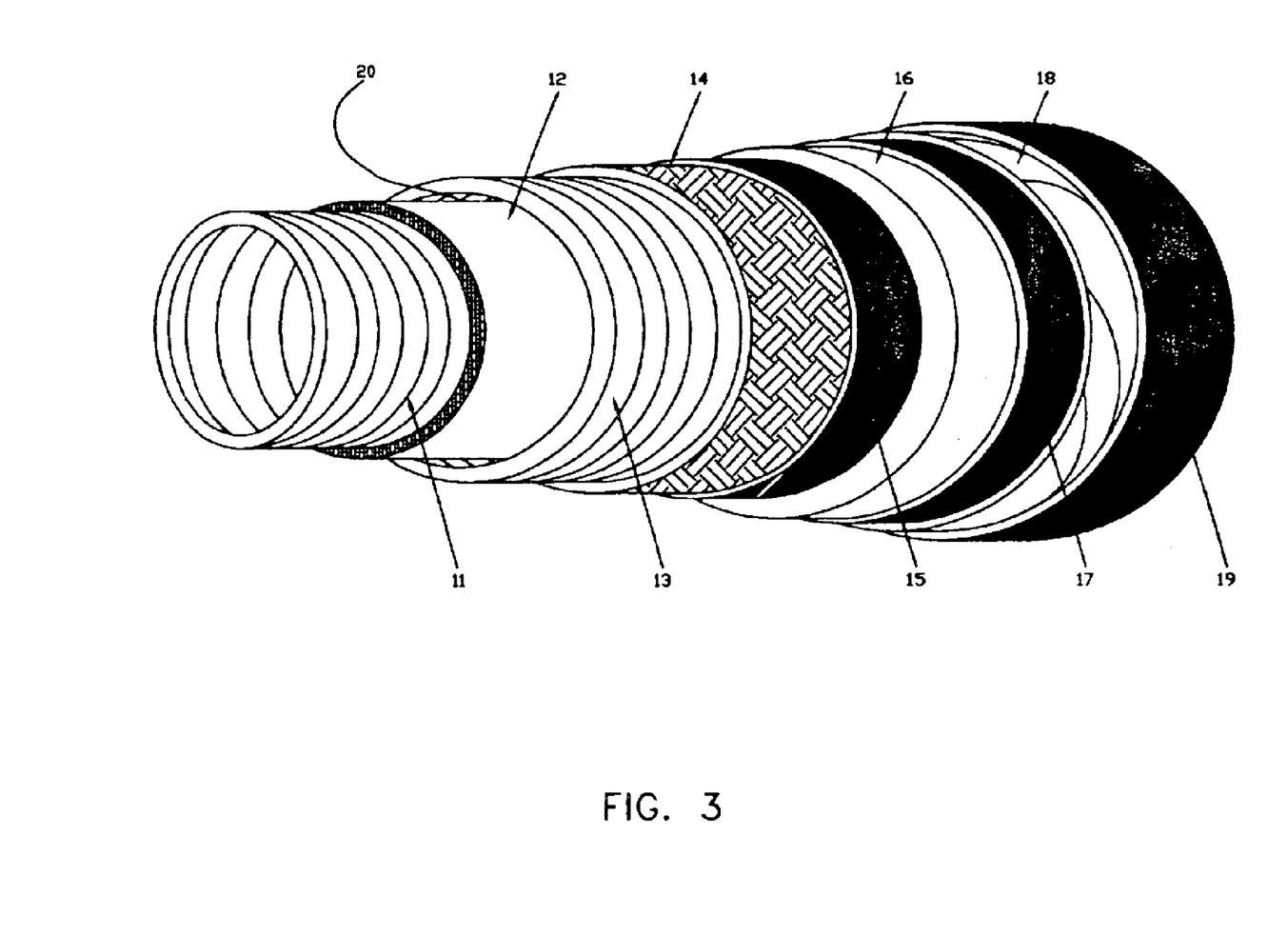
FIG. 3 is a perspective view with cross section of the vacuum section of the central core thermal protection.

The thermal insulation system includes also on the external wall of the corrugated pipe 13, a braided stainless steel mesh 14, FIGS. 1 and 3, offering a uniform surface to the external wall structure of the helical or spiral shaped corrugated pipe.

Figure 4:
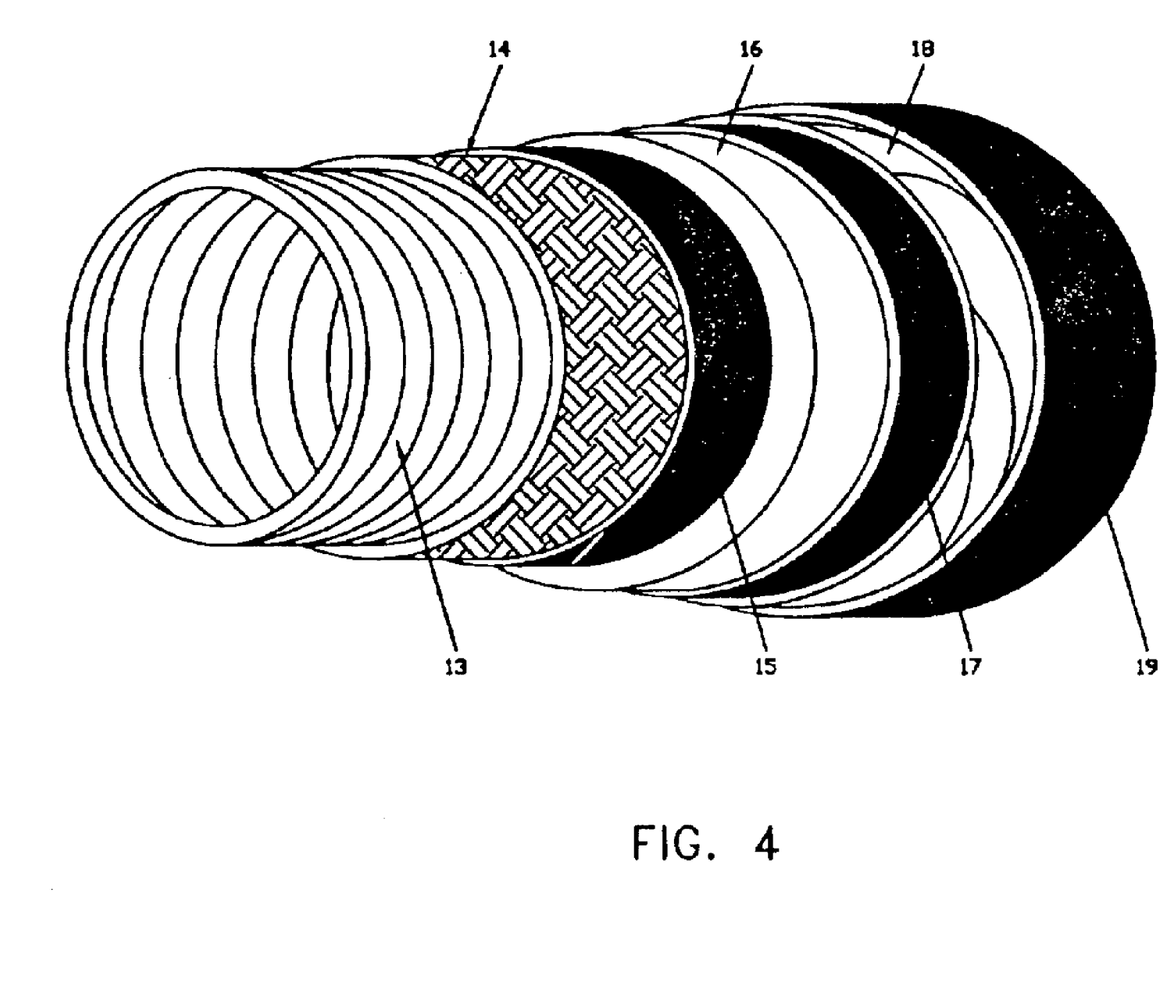
FIG. 4 is a perspective view with cross section of FIG. 3 showing the opposite wall of the thermal insulation.

Around the uniform mesh surface 14, an internal semiconducting shield 15 is applied, which is made of low density thermoplastic polyethylene or any other thermoplastic or thermosetting semiconducting material. The conductivity of said shield should not exceed 1000 Ω m when it is measured at room temperature, said shield having a thickness of at least 0.006 cm. On this semiconducting shield the electric insulation of the cable 16 is placed. Said electric insulation is based on low, medium or high density, thermoplastic or thermosetting or crossed chain polyethylene and/or Ethylene Propylene (EP), the thickness of the insulation being between 0.229 cm and 0.976 cm depending on the operation voltage level of the cable. On this electric insulation, a second semiconducting shield 17 made of the same materials as the internal semiconducting shield 15 is placed, FIG. 4. However, in this case, the thickness of the shield must be at least 0.0129 cm and has to fulfill a maximum volume resistivity of 500 Ωm when measured at room temperature. On this layer, a metal shield made of Cu tape 18 is placed, which must be at least 0.0635 cm thick, having a cross section area of at least 0.1 mm²/mm. On this metal shield 18, a protective casing 19 is placed, possibly made of polyethylene or polyvinyl chloride (PVC) depending on the application of cable, said casing having a thickness ranging between 0.203 and 0.279 cm.

According to the technical requirements, the basic superconductor design parameters used were as follows:

Tape Width (cm): 0.4±0.02
Tape Thickness (cm): 0.02±0.002
Critical current Density (kA/cm²)>7 (criterion of 1 µV/cm)
Filamentary section thickness inside the tape $2b_{sc}$(cm): 0.018
Critical current in the bending deformation voltage value: 0.1%—not below 95% or 0.2%—not below 90%.
About 20% reduction in the critical current when the field is between 0T and 0.1T.

The basic equations to compute the number of superconducting tapes and the design parameters are as follows:
Number of tapes per layer (Ni)

$$Ni = \frac{\pi \times Dio \times \cos\beta i}{2ai(1 + Si)}$$

wherein:
$D_{io}$=average diameter of the i layer
$2a_i$=Tape Width of the i layer
$S_i$=Relative space between the tapes of the i layer
$\beta_i$=Laying angle of the superconducting tapes
Lay of the tapes in a layer (Pi)

$$Pi = \frac{\pi \times Dio}{\tan\beta i}$$

Relative spacing between the tapes of a layer: (Si)

$$Si = \frac{\pi \times Diox\cos\beta i}{2aixNi}$$

Relative deformation voltage $\epsilon_i$ regarding the superconductor in bending conditions of the tapes is:

$$\epsilon_i = 2bscx\sen\beta/Dio$$

The model base of the superconducting high temperature cable has been developed, which consists of the design of the superconducting core itself, as well as the development of insulation based on known and previously developed materials for use in medium and high voltage power cables.

EXAMPLE 1

Under the design conditions, the superconducting tape VAC (Germany) was chosen. Said tape presents a critical current of 59.8 A to 64.7 A depending on the combination of thickness and width of the superconducting tape. Based on these variations, the criteria of linearity of the critical current density used for the cable optimization and calculation is not very congruent, and thus a value of the critical current density in the external magnetic field equals to cero is accepted as 113 A/cm for cable calculations. Taking into account said variations, the followings values were taken as parameters for the calculation.

External Diameter of the core $D_{fe}$=5.5 cm;
Tape thickness $2b_t$=0.002 cm;
Filament section thickness inside the tape $2b_{sc}$=0.018 cm;
Relative space between each tape in each layer S=0.05.
The minimum lay of the tapes (maximum angle of tape laying) is selected based on the limitations imposed by the deformation voltage threshold with regard to bending, for a superconductor when the tapes in one layer are bent on a diameter $D_i$ and the tape laying angle $\beta_i$ is at a maximum permissible value ($\epsilon<0.2\%$, wherein $\epsilon=2b_{sc} \cos \beta_i/D_i$). The critical current of the cable is expected to be between 6 kA and 10 kA, under the criteria of 1 μV/cm and the approximate values of the magnetic field induction on the surface of the sixth layer being between 0.04 T and 0.07 T. For this reason for every 0.001 T increase, the critical current reduction of the tape is expected to be 2% its initial value.

The influence of the deformation voltage on the superconductor with regard to the value of the tape critical current during the manufacturing of cable is described in the comments on Table No. 1.

TABLE NO. 1

Expected manufacturing results
($2_a = 0.38$ cm, $2b_{sc} = 0.018$ cm)

| Layer Number | $D_i$ Bending Mm | $\epsilon$ % | $N_i$ | $I_c$ Tape A | $I_{ci}$ A | $I_{ci}/I_{co}$ | $I_{maxi}$ REAL A | $S_i$ Real |
|---|---|---|---|---|---|---|---|---|
| 1 | 13.32 | 0.135 | 40 | 42.22 | 1688.8 | 0.1667 | 1672.3 | 0.0377 |
| 2 | 17.52 | 0.103 | 42 | 41.54 | 1744.7 | 0.1722 | 1727.6 | 0.0399 |
| 3 | 42.03 | 0.043 | 44 | 40.85 | 1797.4 | 0.1771 | 1779.8 | 0.0446 |
| 4 | 51.72 | 0.035 | 45 | 40.17 | 1807.7 | 0.1784 | 1790.0 | 0.0325 |
| 5 | 15.82 | 0.114 | 42 | 39.49 | 1658.6 | 0.1637 | 1642.3 | 0.0457 |
| 6 | 9.97 | 0.181 | 37 | 38.80 | 1435.6 | 0.1417 | 1435.6 | 0.0484 |
| Σ |  |  |  |  | 10132.8 | 1 | 10047.6 |  |

According to the above table, it can be seen that the current value depends on the maximum deformation voltage if and only if it does not exceed the deformation value of 0.2% which is the critical value of the current. From the results obtained in the above table, we observe that there is uniform current distribution in every layer, which gives a current distribution factor $I_{ci}/I_{co}=1$ and a real maximum critical current value of $I_{MAX\ REAL}=10047$ A.

EXAMPLE 2

However, in Table No. 2, the optimization results of the cable are presented as the criteria to reach the peak critical current value and the minimization of the energy losses under the influence of the flow and axial magnetic field.

TABLE NO. 2

Optimization Results

| Layer Number | $D_i$ Exterior Cm | Tape laying direction | $J_{ct}$ A/cm | $\beta_i$ degrees | $P_f$ cm | $I_{calc}$ $I_i/I_o$ | $J_i$ |
|---|---|---|---|---|---|---|---|
| 1 | 5.554 | L/1 | 111.11 | 24.6 | 37.89 | 0.1671 | 1.0000 |
| 2 | 5.588 | L/1 | 109.31 | 18.6 | 51.96 | 0.1716 | 0.9938 |
| 3 | 5.632 | L/1 | 107.51 | 7.70 | 130.35 | 0.1765 | 0.9859 |
| 4 | 5.676 | R/−1 | 105.71 | 6.30 | 160.89 | 0.1769 | 0.9941 |
| 5 | 5.720 | R/−1 | 103.91 | 21.2 | 46.15 | 0.1648 | 0.9967 |
| 6 | 5.764 | R/−1 | 102.11 | 35.3 | 25.48 | 0.1431 | 0.9985 |
| Σ | 5.764 |  |  |  |  | 1.0000 | 0.9948 |

Maximum current reached $I_{MAX} = 10028.5$
Total sum of the utilization coefficient in the six layers $K_{MAX} = \Sigma_{ji} = 5.96689$ Maximum current reached $I_{MAX}=10028.5$
Total sum of the utilization coefficient in the six layers $K_{MAX=\Sigma ji}=5.96689$ And according to the above mentioned criteria, current distribution is uniform in all the cable layers, and the losses caused by the axial magnetic field are minimized.

Wherein:

$D_i$ exterior=external diameter of the i layer $J_{ci}$=Density of the lineal critical current for the tapes of the i layer $\beta_i$=Tape laying angle for the tapes of the i layer $P_i$=Tape lay for the tapes of the i layer $N_i$=Number of tapes in the i layer $I_{ci}$=Total critical current of all the tapes in the i layer (current i layer) versus the total number of tapes (sum of the critical currents of all the tapes) in the model.

$I_{calc}=I_i/I_o$ Current distribution in the i layer of the total current.

$N_i/N_o=I_{ci}/I_{co}$=Number of tapes in the i layer (critical current in the i layer) versus the total number of tapes (sum of the critical currents of all the tapes) in the model.

$I_{max}$ REAL=Real value of the current peak in the i layer when the current reaches its critical value in at least one of the layers.

$J_i$=Superconductor utilization coefficient in the i layer.

What is claimed is:

1. A superconducting power cable comprising:

a central superconductivity core comprising a first flexible corrugated pipe;

a plurality of stainless steel tape layer around the core;

a plurality of copper tape layer surrounding the stainless steel tape layer;

a plurality of superconducting material on the copper tape layer;

a wrapping tape comprising an insulating material on the superconducting material;

a vacuum thermal insulation system comprising a flexible corrugated pipe on the insulating material;

a plurality of thermal insulation layer applied on the periphery of the flexible corrugated pipe;

a second flexible corrugated pipe on the thermal insulation layer, which forms a vacuum space;

a braided stainless steel mesh on the external wall of the second flexible corrugated pipe;

a first semiconducting shield around the stainless steel mesh surface;

an electric insulation on the first semiconducting shield;

a second semiconducting shield on the electric insulation;

a metal shield on the second semiconducting shield; and a protective casing on the metal shield.

2. The superconducting power cable according to claim 1 wherein the first flexible corrugated pipe comprises stainless steel;

wherein the external diameter of said pipe is at least 2 cm;
wherein the external diameter of said pipe is no more than 6 cm;
wherein the internal diameter of said pipe is at least 1 cm;
wherein the external diameter of said pipe is no more than 4 cm;
wherein corrugation depth of said pipe is at least 0.5 cm; and
wherein the corrugation depth of said pipe is no more than 1 cm.

3. The superconducting power cable according to claim 2 wherein the corrugation pitch of said pipe is at least 0.8 cm;
wherein the corrugation pitch of said pipe is no more than 1.5 cm;
wherein the corrugation depth of said pipe is at least 0.4 cm; and
wherein the corrugation depth of said pipe is no more than 0.5 cm.

4. The superconducting power cable according to claim 2 wherein the corrugation pitch of said pipe is at least 1.6 cm;
wherein the corrugation pitch of said pipe is no more than 3 cm;
wherein the corrugation depth of said pipe is at least 0.4 cm; and
wherein the corrugation depth of said pipe is no more than 0.6 cm.

5. The superconducting power cable according to claim 1 wherein a stainless steel mesh is placed on the first flexible corrugated pipe in order to obtain a relatively flat surface.

6. The superconducting power cable according to claim 1 wherein the width of the stainless steel tape layer is at least 4 cm;
wherein the width of the stainless steel tape layer is no more than 5 cm;
wherein the thickness of the stainless steel tape layer is at least 0.0005 cm; and
wherein the thickness of the stainless steel tape layer is no more than 0.006 cm.

7. The superconducting power cable according to claim 1 wherein a plurality of stainless steel tape layer comprises at least two or more layers of stainless steel tapes.

8. The superconducting power cable according to claim 7 wherein a plurality of stainless steel tape layer is placed on the corrugated pipe; wherein the spacing of the stainless tape layer and corrugated pipe is at least 0.15 cm; and wherein the spacing of the stainless steel tape layer and corrugated pipe is no more than 0.2 cm.

9. The superconducting power cable according to claim 7 wherein the width of the stainless steel tape layer is at least 2.5 cm;
wherein the width of the stainless steel tape layer is no more than 4 cm;
wherein the thickness of the stainless steel tape layer is at least 0.001; and
wherein the thickness of the stainless steel tape layer is no more than 0.002 cm.

10. The superconducting power cable according to claim 7 wherein the spacing of the at least one stainless steel tape layer and another stainless tape layer is from at least 0.1 cm;
wherein the spacing of the at least one stainless steel tape layer and another stainless tape layer is no more than 0.15 cm.

11. The superconducting power cable according to claim 1 wherein a layer of copper tape is placed from at least 0.25 cm wide;
wherein a layer of copper tape is placed no more than 0.40 cm wide; wherein a layer of copper tape is placed at a thickness of from at least 0.025 cm; and
wherein a layer of copper tape is placed at a thickness of no more than 0.030 cm
wherein the cabling length of a layer of copper tape is at least 2 cm;
wherein the cabling length of a layer of copper tape is no more than 100 cm depending on the design of the first layer of superconducting tapes applied.

12. The superconducting power cable according to claim 1 wherein said layer of copper tape is laid at an angle of at least 0°; and
wherein said layer of copper tape is laid at an angle of no more than 45° depending on the cable design.

13. The superconducting power cable according to claim 1 wherein the superconducting material comprises tapes of a 22233 ($Bi_2$ $Sr_2$ $Ca_2$ $Cu_3$ $O_x$) composition commercial product BSCCO.

14. The superconducting power cable according to claim 1 wherein the width of the tape is at least 0.38 cm;
wherein the width of the tape is no more than 0.42 cm;
wherein the thickness of the tape is at least 0.018 cm; and
wherein the thickness of the tape is no more than 0.022 cm.

15. The superconducting power cable according to claim 1 comprising at least a minimum current density of at least 7 $kAC/m^2$ under the criteria of 1 µV/cm (microvolt/centimeter).

16. The superconducting power cable according to claim 1 wherein at least one or more layers of superconducting material tape are laid with a cabling lay length of at least 20 cm;
wherein at least one or more layers of superconducting material tape are laid with a cabling lay length of no more than 300 cm;
wherein at least one or more layers of superconducting material tape are laid at an angle of at least 0°; and
wherein at least one or more layers of superconducting material tape are laid at no more than 45° depending on the design of each layer with a direction that can be right or left.

17. The superconducting power cable according to claim 1 wherein at least one or more layers of superconducting material tape comprises a lay length of at least 20 cm;
wherein at least one or more layers of superconducting material tape comprises a lay length of no more than 300 cm;
wherein at least one or more layers of superconducting material tape are laid at an angle of at least 0°; and
wherein at least one or more layers of superconducting material tape are laid at no more than 45° depending on the design of each layer with a direction that can be right or left with regard to the cabling, in the opposite direction of the previously placed layers.

18. The superconducting power cable according to claim 1 wherein the insulating material comprises a thickness of at least 0.005 cm;
wherein the insulating material comprises a thickness of no more than 0.01 cm;
wherein the insulating material comprises a width of at least 2 cm;
wherein the insulating material comprises a width of no more than 4 cm is laid.

19. The superconducting power cable according to claim 1 wherein the vacuum thermal insulation system comprises a flexible corrugated pipe made of 304 or 316 stainless steel, to hold the superconducting cable and liquid nitrogen.

20. The superconducting power cable according to claim 19 wherein the flexible corrugated pipe comprises an external diameter of at least 4 cm;
wherein the flexible corrugated pipe comprises an external diameter of no more than 8 cm;
wherein the flexible corrugated pipe comprises an internal diameter of at least 3 cm; and
wherein the flexible corrugated pipe comprises an internal diameter of no more than 7 cm.

21. The superconducting power cable according to claim 19 wherein the corrugation depth of the flexible corrugated pipe is at least 0.5 cm;
wherein the corrugation depth of the flexible corrugated pipe is no more than 1 cm;
wherein the corrugation pitch of the flexible corrugated pipe is at least 1 cm;
wherein the corrugation pitch of the flexible corrugated pipe is no more than 2 cm;
wherein the corrugation depth of the flexible corrugated pipe is at least 0.5 cm; and
wherein the corrugation depth of the flexible corrugated pipe is no more than 0.8 cm.

22. The superconducting power cable according to claim 1 wherein the thermal insulation comprises a thickness of at least 0.0005 cm;
wherein the thickness comprises no more than 0.005 cm.

23. The superconducting power cable according to claim 1 wherein the second flexible corrugated pipe which creates the vacuum space, comprises 304 or 316 stainless steel.

24. The superconducting power cable according to claim 23 wherein the stainless steel comprises an external diameter of at least 8 cm;
wherein the stainless steel comprises external diameter is no more than 10 cm;
wherein the stainless steel comprises an internal diameter is at least 6 cm;
wherein the stainless steel comprises an internal diameter is no more than 7 cm;
wherein the corrugation depth of the stainless steel is at least 0.5 cm;
wherein the corrugation depth of the stainless steel is no more than 1.5 cm.

25. The superconducting power cable according to claim 23 wherein the stainless steel comprises a corrugation pitch of at least 1 cm;
wherein the stainless steel comprises a corrugation pitch of no more than 2 cm;
wherein the stainless steel comprises a corrugation depth of at least 0.5 cm; and
wherein the stainless steel comprises a corrugation depth of no more than 1 cm.

26. The superconducting power cable according to claim 1 wherein on the external wall of the corrugated pipe, a braided stainless steel mesh provides a uniform surface to the external wall structure of the helical or spiral shaped corrugated pipe.

27. The superconducting power cable according to claim 1 wherein the first and second semiconducting shields are selected from the group consisting of low density thermoplastic, thermoplastic, thermosetting material and combinations thereof.

28. The superconducting power cable according to claim 1 wherein the first and second semiconducting shields are selected from the group consisting of polyethylene, polyvinyl chloride and combinations thereof.

29. The superconducting power cable according to claim 1 wherein the conductivity of the first semiconducting shield is no more than 1000 $\Omega$m when it is measured at room temperature, said shield having a thickness of at least 0.006 cm.

30. The superconducting power cable according to claim 1 wherein the electric insulation is selected from the group consisting of low density thermoplastic, medium density thermoplastic, high density thermoplastic, low density thermosetting, medium density thermosetting, high density thermosetting, low density thermosetting, and combinations thereof.

31. The superconducting power cable according to claim 30 wherein the electric insulation is selected from the group consisting of polyethylene, ethylene propylene (EP), cross chain polyethylene and combinations thereof.

32. The superconducting power cable according to claim 1 wherein the thickness of the electric insulation is at least 0.229 cm;
wherein the thickness of the electric insulation is no more than 0.976 cm depending on the operation voltage level of the cable.

33. The superconducting power cable according to claim 1 wherein the thickness of the second semiconducting shield is at least 0.0129 cm and has to fulfill a maximum volume resistivity of 500 $\Omega$m when measured at room temperature.

34. The superconducting power cable according to claim 1 wherein the metal shield comprises a thickness of at least 0.0635 cm and a cross section area of at least 0.1 $mm^2$/mm.

35. The superconducting power cable according to claim 1 wherein the protective casing is selected from the group consisting of low density thermoplastic, medium density thermoplastic, high density thermoplastic, low density thermosetting, medium density thermosetting, high density thermosetting, low density thermosetting, and combinations thereof.

36. The superconducting power cable according to claim 1 wherein the protective casing is selected from the group consisting polyethylene, polyvinyl chloride (PVC) and combinations thereof.

37. The superconducting power cable according to claim 1 wherein the thickness the protective casing is at least 0.203 cm;
wherein the thickness of the protective casing is no more than 0.279 cm.

38. A method of providing zero resistance property to the passage of direct current and low power losses in electric transmission comprising the use of a superconducting cable according to claim 1.

39. The superconducting power cable according to claim 1 wherein the vacuum thermal insulation system functions at a temperature of at least 77 °K and under a vacuum pressure of at least 10 mPa (millipascal).

40. The superconducting power cable according to claim 1 wherein the current of the cable is at least 6 KA; and
wherein the current of the cable is no more than 10 KA.

* * * * *